US009655383B2

(12) United States Patent
Holzherr et al.

(10) Patent No.: US 9,655,383 B2
(45) Date of Patent: May 23, 2017

(54) PORTABLE ELECTRONIC SYSTEM INCLUDING CHARGING DEVICE AND METHOD OF CHARGING A SECONDARY BATTERY

(71) Applicant: Philip Morris Products S.A., Neuchatel (CH)

(72) Inventors: Raphael Holzherr, Fontaines (FR); Felix Fernando, Wokingham (GB)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 14/423,604

(22) PCT Filed: Aug. 23, 2013

(86) PCT No.: PCT/EP2013/067563
§ 371 (c)(1),
(2) Date: Feb. 24, 2015

(87) PCT Pub. No.: WO2014/029880
PCT Pub. Date: Feb. 27, 2014

(65) Prior Publication Data
US 2015/0181942 A1    Jul. 2, 2015

(30) Foreign Application Priority Data
Aug. 24, 2012  (EP) .................................. 12181682

(51) Int. Cl.
*A24F 47/00*   (2006.01)
*H02J 7/00*    (2006.01)
(Continued)

(52) U.S. Cl.
CPC ......... *A24F 47/008* (2013.01); *H01M 2/1027* (2013.01); *H02J 7/008* (2013.01);
(Continued)

(58) Field of Classification Search
None
See application file for complete search history.

(56) References Cited

U.S. PATENT DOCUMENTS 5,903,136 A    5/1999   Takahashi et al.
5,994,878 A   11/1999   Ostergaard et al.
(Continued)

FOREIGN PATENT DOCUMENTS

CN    1302467 A    7/2001
CN    1725598 A    1/2006
(Continued)

OTHER PUBLICATIONS

Office Action issued on Feb. 22, 2016 in Japanese Patent Application No. 2015-527935 (submitting English language translation only).
(Continued)

*Primary Examiner* — Michael J Felton
(74) *Attorney, Agent, or Firm* — Oblon, McClelland, Maier & Neustadt, L.L.P.

(57) ABSTRACT

There is provided a portable electrical system including primary and secondary devices, the primary device having a first, lithium cobalt oxide battery, and the secondary device having a second, lithium iron phosphate or lithium titanate battery, wherein the primary and secondary devices are configured to allow recharging of the second battery from the first battery at a rate of between 2C and 16C.

13 Claims, 6 Drawing Sheets

(51) Int. Cl.
  *H04B 3/54*    (2006.01)
  *H01M 2/10*    (2006.01)
  *H05B 3/02*    (2006.01)

(52) U.S. Cl.
  CPC .......... *H02J 7/0031* (2013.01); *H02J 7/0052* (2013.01); *H02J 7/0054* (2013.01); *H04B 3/54* (2013.01); *H05B 3/02* (2013.01); *H02J 7/007* (2013.01); *H02J 2007/004* (2013.01)

(56) References Cited

U.S. PATENT DOCUMENTS

| | | | |
|---|---|---|---|
| 6,208,117 | B1 | 3/2001 | Hibi |
| 7,598,709 | B2 | 10/2009 | Guang et al. |
| 7,683,574 | B2 | 3/2010 | Guang et al. |
| 8,125,190 | B2 * | 2/2012 | Odaohhara .............. H02J 7/045 320/112 |
| 2002/0000788 | A1 | 1/2002 | Ostergaard et al. |
| 2005/0194933 | A1 | 9/2005 | Arnold et al. |
| 2005/0194934 | A1 | 9/2005 | Iijima et al. |
| 2006/0061330 | A1 | 3/2006 | Sato et al. |
| 2008/0024090 | A1 | 1/2008 | Guang et al. |
| 2008/0238363 | A1 | 10/2008 | Bourilkov et al. |
| 2009/0200986 | A1 | 8/2009 | Kopera |
| 2010/0313901 | A1 * | 12/2010 | Fernando .............. A24F 47/008 131/330 |
| 2012/0200266 | A1 | 8/2012 | Berkowitz et al. |
| 2013/0316209 | A1 * | 11/2013 | Masumoto .............. H01M 2/08 429/94 |
| 2014/0014125 | A1 | 1/2014 | Fernando et al. |
| 2015/0189916 | A1 * | 7/2015 | Wu ...................... A24F 47/008 219/510 |

FOREIGN PATENT DOCUMENTS

| | | |
|---|---|---|
| CN | 1845418 A | 10/2006 |
| CN | 201341434 Y | 11/2009 |
| CN | 101647176 A | 2/2010 |
| CN | 101647177 A | 2/2010 |
| CN | 201571500 U | 9/2010 |
| CN | 102438470 A | 5/2012 |
| EP | 2 110 033 A1 | 10/2009 |
| EP | 2 454 956 A1 | 5/2012 |
| JP | 2011-34699 A | 2/2011 |
| RU | 91492 U1 | 2/2010 |
| WO | WO 99/17418 A1 | 4/1999 |
| WO | WO 2006/071972 A2 | 7/2006 |
| WO | WO 2008/117219 A2 | 10/2008 |
| WO | WO 2008/117221 A2 | 10/2008 |
| WO | WO 2010/133342 A1 | 11/2010 |

OTHER PUBLICATIONS

International Search Report issued Jul. 18, 2014 in PCT/EP2013/067563.
Partial European Search Report issued Feb. 7, 2013 in Patent Application No. 12181682.1.
Extended European Search Report issued May 17, 2013 in Patent Application No. 12181682.1.
International Preliminary Report on Patentability issued Feb. 6, 2015 in PCT/EP2013/067563.
Written Opinion of the International Searching Authority issued Jul. 18, 2014 in PCT/EP2013/067563.
Anonymous, "Types of Lithium-ion", Battery University, Retrieved from the Internet: URL:http://web.archive.org/web/20120617172010/http://batteryuniversity.com/learn/article/types_of_lithium ion [retrieved—on—Apr. 22, 2013], XP 002695798, (Jun. 17, 2012), 6 pages.
Anonymous, "Products/Performance", Altairnano, Retrieved from the Internet: URL:http://web.archive.org/web/20120716232611/http://www.altairnano.com/products/performance/, [retrieved on Mar. 24, 2014], XP 002722204, (Jul. 16, 2012), 3 pages.
Rui Xu, et al., "Ultrafine metatitanic acid electrode for ultrafast lithium ion batteries", Electrochimica Acta, Elsevier, vol. 56, No. 18, XP028230350, (2011), pp. 6330-6335.
Paul V. Braun, et al., "High power rechargeable batteries", Current Opinion in Solid State and Materials Science, vol. 16, No. 4, XP028401983, (2012), pp. 186-198.
Gang Ning, et al., "Capacity fade study of lithium-ion batteries cycled at high discharge rates", Journal of Power Sources, vol. 117, Elsevier, (2003), pp. 160-169.
Tugee Yuksel, et al., "Evaluation of the Effects of Thermal Management on Battery Life in Plug-in Hybrid Electric Vehicles", www.cmu.edu/.../2012-Battery-Congress, (2012), 12 pages.
Byoungwoo Kang, et al., "Battery materials for ultrafast charging and discharging", Nature, vol. 458, (Mar. 12, 2009), pp. 190-193.
Haisheng Tao, et al., "Reality and Future of Rechargeable Lithium Batteries", The Open Materials Science Journal, 2011, 5, (Suppl 1: M2), pp. 204-214.
J.-M. Tarascon, et al., "Issues and challenges facing rechargeable lithium batteries", Nature, vol. 414, (Nov. 15, 2001), pp. 359-367.
Zhe Li, et al., "Modeling the capacity degradation of LiFePO4/graphite batteries based on stress coupling analysis", Journal of Power Sources, vol. 196, (2011), pp. 9757-9766.
Written Opinion issued on Dec. 7, 2015 in Singaporean Patent Application No. 11201501313Q.
Combined Chinese Office Action and Search Report issued Oct. 10, 2016 in Chinese Patent Application No. 201380044030.6 (submitting English translation only).
Notice of Allowance issued on Sep. 26, 2016 in Russian Patent Application No. 2015110242/07(016131) (with English translation of category of cited documents).

* cited by examiner

PORTABLE ELECTRONIC SYSTEM INCLUDING CHARGING DEVICE AND METHOD OF CHARGING A SECONDARY BATTERY

CROSS REFERENCE TO RELATED APPLICATION

This application is a national phase application based on PCT/EP2013/067563, filed on Aug. 23, 2013.

The present invention relates to a portable electronic system including a charger and a secondary device, and to methods for charging and operation of the secondary device. The invention may be applied to portable electronic smoking systems.

Electrically operated smoking systems of the prior art typically include a housing for receiving a smoking article, heating elements to generate an aerosol, a power source and electronic circuitry to control operation of the system.

Portable electronic smoking devices need to be small and convenient for the user if they are to be widely adopted by smokers of conventional cigarettes. This leads to several technical requirements for the power source of a portable electronic smoking device. The power source, typically a battery, must be small enough to fit within a smoking device of similar size to a conventional cigarette and must deliver sufficient power to generate an aerosol from a smoking article. The idea of using a rechargeable battery has been suggested in the prior art, but in any commercially viable system the rechargeable battery must be able to deliver enough power for at least one smoking session, must be able to be quickly, safely and conveniently recharged to a level at which it can be reused for another smoking session, and must be operable for thousands of charge cycles.

It is an object of the present invention to provide a system and charging method that meet these requirements for a rechargeable power source.

In one aspect of the invention, there is provided a portable electrical system comprising primary and secondary devices, the primary device having a first, lithium cobalt oxide battery and the secondary device having a second, lithium iron phosphate or lithium titanate battery, wherein the primary and secondary devices are configured to recharge, or to allow recharging of, the second battery from the first battery at a rate between 2 C and 16 C.

The secondary device may be an electrically heated smoking device. The electrically heated smoking device may comprise an electrical heater powered by the second battery. The electrical heater may be configured to heat an aerosol-forming substrate. The primary device may be a portable charging unit, and may be made a shape and size similar to a conventional pack of cigarettes. The secondary device may be received within the secondary device during a recharging cycle.

The use of a lithium iron phosphate (or lithium titanate) battery for the secondary device safely allows for fast charge and discharge rates. In the case of an electrically heated smoking device, fast discharge is required because high power is required to be delivered to the heater over a time period of only a few minutes. Fast charge is required because smokers often wish to smoke another cigarette very shortly after a first cigarette.

To provide charging of the second battery from a single first battery, the first battery must have a higher voltage than the second battery. The first battery must also have greater charge capacity than the second battery if it is to provide for multiple recharge cycles before needing recharging or replacing itself. A lithium cobalt oxide battery chemistry provides for a greater battery voltage, and a greater charge capacity for a given size, than a lithium iron phosphate (or lithium titanate) battery. The combination of a primary device having a first, lithium cobalt oxide battery and a secondary device having a second, lithium iron phosphate or lithium titanate battery is therefore advantageous for a portable electrical smoking system, or any similar portable system in which a secondary device requires a short burst of high power from a battery.

The capacity of the first battery may advantageously be at least five times greater than the capacity of the second battery. The capacity of the first battery may advantageously be between five and forty times the capacity of the second battery. The primary device may be configured to allow recharging of the first battery from a mains supply at a rate of between 0 and 1.5 C.

The second battery is advantageously able to undergo at least 6000 charge/discharge cycles at more than 900 J per cycle, and may be able to undergo at least 7000 charge/discharge cycles at more than 900 J per cycle or at least 8000 charge/discharge cycles at more than 900 J per cycle. The average charging rate may be up to 12 C. The second battery is advantageously able to undergo at least 6000 charge/discharge cycles, and preferably at least 8000 charge/discharge cycles without dropping below a threshold battery capacity, for example 80% of the rated battery capacity. The discharging rate of the second battery may be around 13 C but may be as much as 28 C.

The primary device may comprise: a pair of output terminals for connection to the secondary battery; a DC power source; a voltage regulator connected between the DC power source and to the output terminals for controlling a charging voltage; and a microprocessor coupled to the voltage regulator and to the output terminals, wherein the charging device and secondary battery are configured to be coupled together and to form a charging circuit, and wherein the microprocessor is configured to:

control the voltage regulator to supply a first charging voltage;

determine an internal resistance of the charging circuit by measuring the current in the charging circuit at the first charging voltage and at a second charging voltage, wherein the second charging voltage is lower than the first charging voltage; and limit the first charging voltage supplied by the voltage regulator to a level that compensates for the determined internal resistance.

The primary device may comprise: a pair of output terminals for connection to a secondary battery; a DC power source; a voltage regulator connected between the DC power source and to the output terminals for controlling a charging voltage; and a microprocessor coupled to the voltage regulator and to the output terminals, wherein the charging device and secondary battery are configured to be coupled together and to form a charging circuit, and wherein the microprocessor is configured to:

control the voltage regulator to supply a first charging voltage;

determine an internal resistance of the charging circuit;

calculate a maximum charging voltage based on the determined internal resistance and a characteristic of the secondary battery;

adjust the first charging voltage to maintain a predetermined charging current until the first charging voltage reaches the maximum charging voltage, thereafter adjust the first charging voltage to a level at or below the maximum charging voltage, and thereafter periodically or continuously recalculate the maximum charging voltage and adjust the charging voltage to maintain it at a level at or below the recalculated maximum charging voltage.

In a second aspect of the disclosure, there is provided a method of charging a second battery in a secondary device from a first battery in a primary device, the primary and secondary devices forming a portable electrical system, the primary device having a first, lithium cobalt oxide battery and the secondary device having a second, lithium iron phosphate or lithium titanate battery, comprising: charging the second battery from the first battery at a rate of between 2 C and 16 C.

In a third aspect of the disclosure, there is provided an electrically heated smoking system comprising:
 a lithium iron phosphate or lithium titanate battery;
 a heater element, wherein operation of the heater element discharges the battery; and
 a discharge detection circuit connected to the battery, wherein system is configured to disable operation of the heater element when the discharge detection circuits determines that the battery voltage is less than a threshold voltage level.

The threshold voltage level may be set to a voltage above a voltage below which battery capacity is irrecoverably reduced. For example, the battery may have a maximum battery voltage and the threshold voltage level may be between 15% and 25% of the maximum battery voltage. Below this level of charge battery capacity may be irrecoverably lost. However, improvements or changes in battery chemistry may allow the threshold level to be reduced to below 15%, for example to 5% of maximum battery voltage.

Ensuring that the battery does not fully discharge substantially reduces irreversible reactions in the battery, and thereby preserves the operational life of the battery.

Advantageously, following disabling of the heating element when the discharge detection circuit determines that the battery voltage is less than a threshold voltage level, the system is configured to maintain disablement of the heater element until the battery has been charged to a threshold charge level sufficient to complete a single smoking experience. The threshold charge level may be approximately 90% of maximum battery capacity.

In a fourth aspect of the disclosure, there is provided a method of operating an electrically heated smoking system comprising:
 a lithium iron phosphate or lithium titanate battery;
 a heater element, wherein operation of the heater element discharges the battery; and
 a discharge detection circuit connected to the battery, comprising:
 disabling operation of the heater element when the discharge detection circuit determines that the battery voltage is less than a threshold voltage level.

The method may further comprise the step of maintaining disablement of the heater element until the battery has been charged to a threshold charge level sufficient to complete a single smoking experience.

A fifth aspect of the disclosure provides a charging device for charging a secondary battery, the charging device comprising:
 a pair of output terminals for connection to the secondary battery, a DC power source, a voltage regulator connected between the DC power source and to the output terminals for controlling a charging voltage, and a microprocessor coupled to the voltage regulator and to the output terminals, wherein the charging device and secondary battery are configured to be coupled together and to form a charging circuit, and wherein the microprocessor is configured to:
 control the voltage regulator to supply a first charging voltage;
 determine an internal resistance of the charging circuit by measuring the current in the charging circuit at the first charging voltage and at a second charging voltage, wherein the second charging voltage is lower than the first charging voltage; and
 limit the first charging voltage supplied by the voltage regulator to a level that compensates for the determined internal resistance.

With an ideal charging system, the charging profile is split into two parts: a constant current phase and a constant voltage phase. In the constant current phase, the voltage across the secondary battery is adjusted to maintain a constant maximum charging current $I_{ch}$ until the voltage across the battery reaches a defined voltage limit $V_{ch}$, with $I_{ch}$ and $V_{ch}$ set by the properties of the battery. In the constant voltage phase the voltage across the battery is maintained at a fixed value $V_{ch}$ until the current drops below a predetermined value $I_{low}$. For rapid charging it is desirable to maximise the length of the constant current phase.

In practice the charging system is never ideal. The charging circuit formed by the charging device and the secondary battery has an internal resistance both as a result of the components of the charging circuit and the contact resistance between the charging device and the secondary battery. A proportion of the charging voltage supplied by the charging device will be dropped across the internal resistance of the charging circuit, so that the voltage across the secondary battery is less than the charging voltage supplied by the charging device. The charging device of the first aspect of the disclosure can provide a charging voltage greater than $V_{ch}$. By determining the internal resistance of the charging circuit, the amount by which the charging voltage can exceed $V_{ch}$ so that the voltage across the battery is equal to or just less than $V_{ch}$ can be calculated. In this way the charging device supplies a charging voltage that compensates for the voltage drop across the internal resistance of the charging circuit. This increases the duration of the constant current charging phase because determining the cut off voltage $V_{ch}$ at the battery rather than at the voltage regulator means the cut off voltage is reached later.

The internal resistance of the charging circuit changes over time. The internal resistance of the battery increases with the life of the battery. The contact resistance between the charging device and the secondary battery may also change over time and will vary from charger to charger and battery to battery. The charging device of the first aspect of the disclosure is configured to determine the internal resistance of the charging circuit during every charging cycle to ensure that the length of the constant current portion of the charging cycle is maximised.

During a constant voltage phase, the microprocessor may be configured to limit the charging voltage supplied by the voltage regulator so that a voltage received by the secondary battery is equal to a predetermined maximum voltage, $V_{ch}$.

The second charging voltage is preferably non-zero and may have a predetermined voltage difference from the first charging voltage. Alternatively, the second charging voltage may be a predetermined non-zero voltage. With the second charging voltage non-zero, there is never any interruption to the charging process, which would lengthen the charge time.

The microprocessor may be configured to adjust the first charging voltage to maintain a constant charging current in the charging circuit until the charging voltage exceeds a maximum charging voltage, the maximum charging voltage calculated based on the characteristics of the secondary battery and the determined internal resistance of the charging circuit.

The microprocessor may be configured to calculate the maximum voltage and adjust the first charging voltage to maintain it at a level at or below the maximum charging voltage a plurality of times during a single charging cycle. Rather than simply supplying a constant charging voltage during a constant voltage phase, it is advantageous to provide an adjusted charging voltage that compensates for the voltage dropped across the internal resistance of the charging circuit. As the secondary battery approaches a fully charged level, the charging current for a given charging voltage falls. As a result, the voltage dropped across the internal resistance of the charging circuit falls. This in turn means that the charging voltage required to be supplied by the voltage regulator to ensure that the voltage across the battery is equal to $V_{ch}$ falls. It is therefore advantageous to recalculate the maximum charging voltage a plurality of times during a charging cycle, particularly as the charging current is falling. Accordingly, the microprocessor may be configured to continuously or periodically recalculate the maximum voltage and adjust the first charging voltage to maintain it at a level at or below the maximum charging voltage after the first charging voltage first reaches the maximum charging voltage during a single charging cycle.

The microprocessor may be configured to determine the internal resistance and calculate the maximum charging voltage only after the first charging voltage has reached a predetermined voltage level. For example, the predetermined voltage level may be $V_{ch}$, the maximum battery voltage.

According to a sixth aspect of the disclosure, there is provided a method of charging a secondary battery comprising:

connecting the secondary battery to a charging device having an adjustable voltage source to form a charging circuit;

controlling a first voltage supplied by the voltage source to provide a predetermined charging current to the secondary battery;

determining an internal resistance of the charging circuit by measuring the current in the charging circuit at the first charging voltage and at a second charging voltage, wherein the second charging voltage is lower than the first charging voltage;

calculating a maximum charging voltage based on the determined internal resistance and a characteristic of the secondary battery; and adjusting the first charging voltage to maintain a predetermined charging current until the first charging voltage reaches the maximum voltage level, and thereafter adjusting the first charging voltage to maintain it at a level at or below the maximum charging voltage.

As in the fifth aspect, the second charging voltage is preferably non-zero and may have a predetermined voltage difference from the first charging voltage.

The steps of calculating the maximum voltage and adjusting the first charging voltage to maintain it at a level at or below the maximum charging voltage may be carried out a plurality of times during a single charging cycle.

The steps of calculating the maximum voltage and adjusting the first charging voltage to maintain it at a level at or below the maximum charging voltage may be carried out continuously after the first charging voltage first reaches the maximum charging voltage during a single charging cycle.

The step of determining the internal resistance may be carried out periodically during a charging cycle.

The steps of determining the internal resistance and calculating the maximum charging voltage may be carried only after the first charging voltage has reached a predetermined voltage level. For example, the predetermined voltage level may be $V_{ch}$, the maximum battery voltage.

In a seventh aspect of the disclosure, there is provided a charging device comprising:

a pair of output terminals for connection to a secondary battery;

a DC power source;

a voltage regulator connected between the DC power source and to the output terminals for controlling a charging voltage; and a microprocessor coupled to the voltage regulator and to the output terminals, wherein the charging device and secondary battery are configured to be coupled together and to form a charging circuit, and wherein the microprocessor is configured to:

control the voltage regulator to supply a first charging voltage;

determine an internal resistance of the charging circuit;

calculate a maximum charging voltage based on the determined internal resistance and a characteristic of the secondary battery;

adjust the first charging voltage to maintain a predetermined charging current until the first charging voltage reaches the maximum charging voltage, thereafter adjust the first charging voltage to a level at or below the maximum charging voltage, and thereafter periodically or continuously recalculate the maximum charging voltage and adjust the charging voltage to maintain it at a level at or below the recalculated maximum charging voltage.

Rather than simply supplying a constant charging voltage during a constant voltage phase, it is advantageous to provide an adjusted charging voltage that compensates for the voltage dropped across the internal resistance of the charging circuit. As the secondary battery approaches a fully charged level, the charging current falls for a given charging voltage. As a result, the voltage dropped across the internal resistance of the charging circuit falls. This in turn means that the charging voltage required to be supplied by the voltage regulator to ensure that the voltage across the battery is equal to $V_{ch}$ falls. It is therefore advantageous to recalculate the maximum charging voltage a plurality of times during a charging cycle, particularly as the charging current is falling. Accordingly, the microprocessor is configured to continuously or periodically recalculate the maximum voltage and adjust the first charging voltage to maintain it at a level at or below the maximum charging voltage after the first charging voltage first reaches the maximum charging voltage. The step of determining the internal resistance may comprise measuring the internal resistance or estimating the internal resistance.

In an eighth aspect of the disclosure, there is provided a method of charging a secondary battery comprising:

connecting the secondary battery to a charging device having an adjustable voltage source to form a charging circuit;

controlling a first voltage supplied by the voltage source to provide a predetermined charging current to the secondary battery;

determining an internal resistance of the charging circuit;

calculating a maximum charging voltage based on the determined internal resistance and a characteristic of the secondary battery;

adjusting the first charging voltage to maintain a predetermined charging current until the first charging voltage reaches the maximum charging voltage, thereafter adjusting the first charging voltage to a level at or below the maximum charging voltage; and thereafter periodically or continuously recalculating the maximum charging voltage and adjusting the charging voltage to maintain it at a level at or below the recalculated maximum charging voltage.

The charging device and method in accordance with the fifth, sixth, seventh and eighth aspects of the disclosure may be applied to electronic smoking systems. The charging device may be used to charge a secondary battery in an electronic smoking device. The electronic smoking device may include an electrically powered heater configured to heat an aerosol-forming substrate. The aerosol-forming substrate may be provided in the form of a cigarette having a mouthpiece portion on which an and user inhales. The secondary battery may advantageously provide sufficient power for a single smoking session, exhausting a single aerosol-forming substrate.

A short recharging time is crucial for the acceptance of electronic cigarettes. The charging device and charging method of the present disclosure maximise the duration of a constant current phase of the recharging process and also maximise the voltage across the secondary battery when the constant current phase has ended.

In an eighth aspect, there is provided a method of qualification testing a lithium iron phosphate or lithium titanate battery, comprising:
a) charging the battery at a rate of at least 2 C;
b) discharging the battery;
c) repeating steps a) and b) at least 6000 times;
d) subsequent to step c), determining that the battery meets a qualification standard if the battery capacity is greater than a threshold capacity.

The threshold capacity may be a percentage of the rated capacity of the battery, for example 80% of the rated battery capacity.

The step of charging the battery may comprise charging at an average rate of 12 C. The step of discharging may be carried out at a rate of around 13 C and may be performed using millisecond pulses. Step c) may comprise repeating steps a) and b) at least 7000 times or at least 8000 times.

In a ninth aspect, there is provided a method of qualification testing a batch of lithium iron phosphate or lithium titanate batteries, comprising selecting a sample of a plurality of batteries from the batch of batteries, and performing the method of the eighth aspect on each of the plurality of batteries. The plurality of batteries may be selected at random from the batch. If all of the plurality of batteries meet the qualification standard, then the batch of batteries may be determined to meet the qualification standard.

In a tenth aspect there is provided a battery or batch of batteries determined to meet a qualification standard in accordance with the eighth aspect.

It should be clear that features described in relation to one aspect of the disclosure may be applied to other aspects of the disclosure, alone or in combination with other described aspects and features of the disclosure.

Examples in accordance with the various aspects of the disclosure will now be described in detail, with reference to accompanying drawings, in which:

FIG. 2b is a flow diagram illustrating a control process for the charging profile of FIG. 2a;

FIG. 5a is a flow diagram illustrating a control process for the charging profile of FIG. 4;

Figure 1:
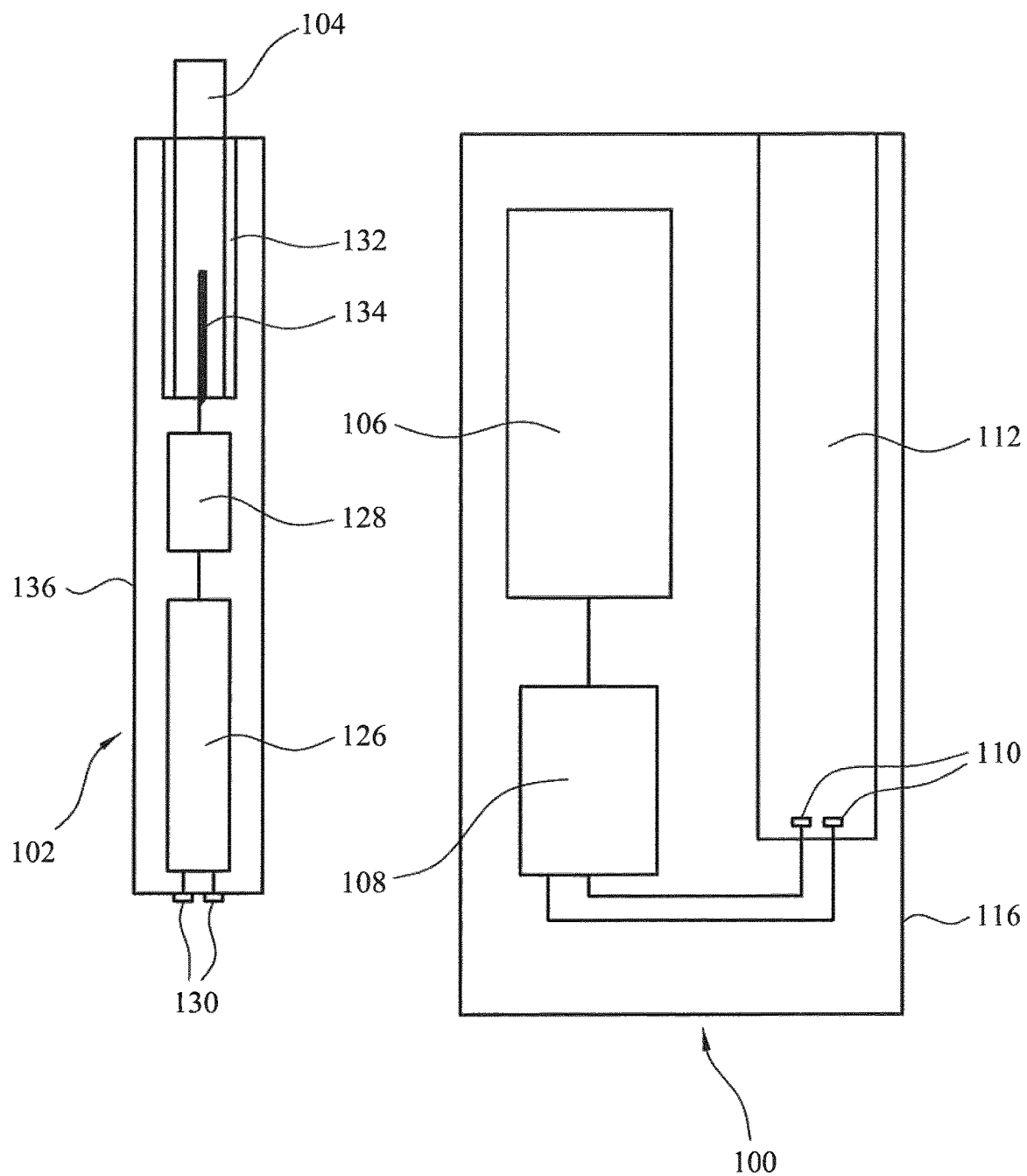
FIG. 1 is a schematic diagram showing an example of an electronic smoking system comprising primary and secondary units.

FIG. 1 shows a primary device 100 and a secondary device 102. The primary device 100 in this example is a charging unit for an electrically heated smoking system. The secondary device 102 in this example is an electrically heated aerosol-generating device adapted to receive a smoking article 104 comprising an aerosol-forming substrate. The secondary device includes a heater to heat the aerosol forming substrate in operation. The user inhales on a mouthpiece portion of the smoking article 104 to draw aerosol into the user's mouth. The secondary device 102 is configured to be received within a cavity 112 in the primary device 100 in order to recharge the power supply in the secondary device.

The primary device 100 comprises first battery 106, control electronics 108, and electrical contacts 110 configured to provide electrical power to a second battery in the secondary device, from the first battery 106, when the secondary device is in connection with the electrical contacts 110. The electrical contacts 110 are provided adjacent the bottom of a cavity 112. The cavity is configured to receive the secondary device 102. The components of the primary device 100 are housed within the housing 116.

The secondary device 102 comprises a second battery 126, secondary control electronics 128 and electrical contacts 130. As described above, the second, rechargeable battery 126 of the secondary device 102 is configured to receive a supply of power from the first battery 106 when the electrical contacts 130 are in contact with the electrical contacts 110 of the primary device 100. The secondary device 102 further comprises a cavity 132 configured to receive the smoking article 104. A heater 134, in the form of, for example, a blade heater, is provided at the bottom of the cavity 132. In use, the user activates the secondary device 102, and power is provided from the battery 126 via the control electronics 128 to the heater 134. The heater is heated to a standard operational temperature that is sufficient to generate an aerosol from the aerosol-forming substrate of the aerosol-generating article 104. The components of the secondary device 102 are housed within the housing 136. A secondary device of this type is described more fully in EP2110033 for example.

The aerosol-forming substrate preferably comprises a tobacco-containing material containing volatile tobacco flavour compounds which are released from the substrate upon heating. Alternatively, the aerosol-forming substrate may comprise a non-tobacco material. Preferably, the aerosol-forming substrate further comprises an aerosol former. Examples of suitable aerosol formers are glycerine and propylene glycol.

The aerosol-forming substrate may be a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco. Alternatively, the aerosol-forming substrate may be a liquid substrate and the smoking article may comprise means for retaining the liquid substrate. The aerosol-forming substrate may alternatively be any other sort of substrate, for example, a gas substrate, or any combination of the various types of substrate.

In this example, the secondary device 102 is an electrically heated smoking device. As such the secondary device 102 is small (conventional cigarette size) but must deliver high power over a period of just a few minutes, typically around 7 minutes for a single smoking session. The second battery may then need to be returned to the primary device 100 for recharging. Recharging is desirably completed, at least to a level sufficient to allow for another complete smoking experience, in a matter of a few minutes and preferably less than 6 minutes.

The first battery 106 in the primary device is configured to hold sufficient charge to recharge the second battery 126 several times before needing recharging itself. This provides the user with a portable system that allows for several smoking sessions before recharging from a mains outlet is required.

It is also desirable that the second battery need not be frequently replaced. Preferably the second battery has a useful life of at least one year, equating to around 8000 charge/discharge cycles for a typical user.

In order to satisfy the competing requirements for the second battery 126 of small size, sufficient capacity and safe, but fast, charge and discharge, as well as acceptable lifetime, a lithium iron phosphate (LiFePO4) battery chemistry may be used, as in this example. The second battery 126 in this example has a cylindrical shape, with a diameter of 10 mm and a length of 37 mm. This battery is able to undergo 8000 cycles of charge/discharge at more than 900 J per cycle. The average charging rate may be up to 12 C. A charging rate of 1 C means that the battery is fully charged from zero charge to full charge in one hour and a charging rate of 2 C means that the battery is fully charged from zero charge to full charge in half an hour. The battery capacity is in the region of 125 mAh. The maximum charging current can range from 980 mA to 1.5 A. Discharging is performed using 1 millisecond pulses of up to 2 A. Discharge rate depends on the resistance of the heater, which is in turn dependent of the heater temperature. At ambient temperature the discharge rate may be as high as 28 C but is reduced at higher temperatures as the resistance of the heater increases. At typical operating temperature the discharging rate is around 13 C. As an alternative, a lithium titanate battery may be used for the second battery.

A sample of second batteries may be qualification tested to ensure that they are able to meet a qualification standard in terms of number of useful cycles of charge discharge. The qualification testing may comprise: charging the battery at a rate of at least 2 C; discharging the battery; repeating the charge/discharge cycle at least 6000 times; and then determining that the battery meets a qualification standard if the battery capacity is greater than a threshold capacity, such as 80% of the original rated battery capacity.

The first battery 106 in the primary unit 100 is a lithium cobalt oxide (LiCoO2) battery of the prismatic type. The first battery has a capacity of around 1350 mAh, over ten times the capacity of the second battery. The second battery may be charged from the first battery at a rate between 2 C and 16 C. Discharging the first battery at a rate of 1 C provides a charging rate of over 10 C to the second battery. Charging of the first battery can be performed from a mains supply, at a rate between 0 and 1.5 C, and typically at a rate of around 0.5 C to maximise battery life.

A lithium cobalt oxide battery provides a higher battery voltage than lithium iron phosphate, allowing the charging of a lithium iron phosphate battery from a single lithium cobalt oxide battery.

Figure 2A:
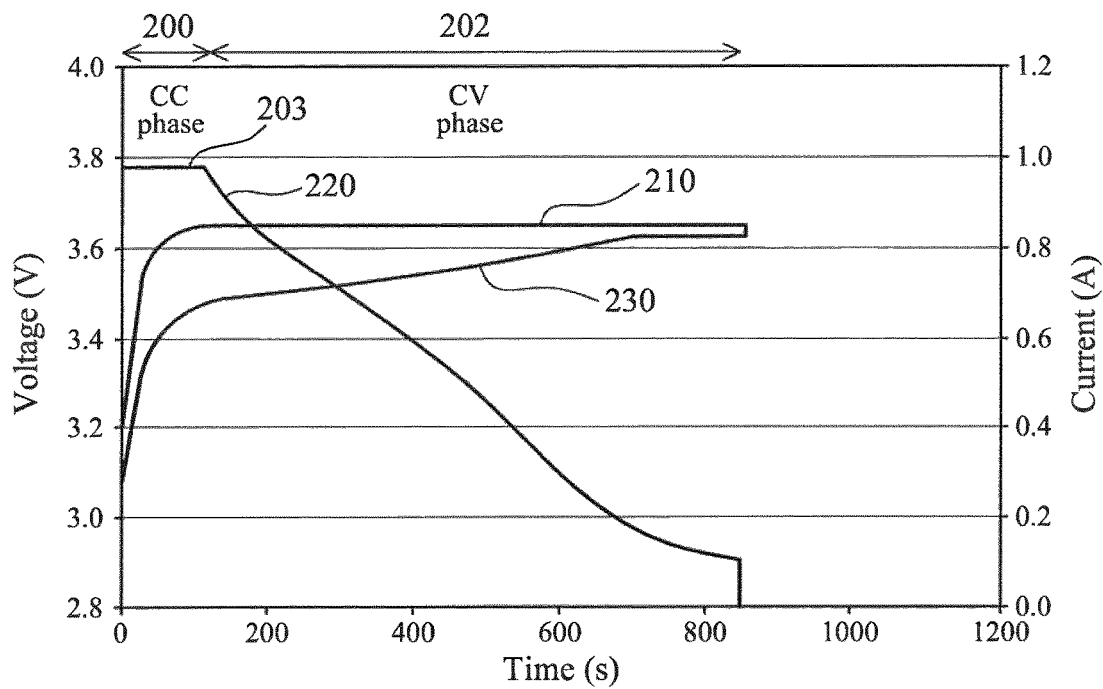
FIG. 2a shows a standard charging profile for a rechargeable battery in accordance with the prior art.

FIG. 2a shows a standard charging profile for charging a rechargeable battery. FIG. 2a shows the charging voltage from the charging device 210, the charging current 220 from the charging device and the battery voltage 230 of the second battery being charged. The charging profile consists of an initial constant current phase 300. During the constant current phase 300 the charging voltage 210 is controlled so as to provide constant, maximum charging current $I_{ch}$. This provides for the maximum rate of charging. However, the constant charging current phase 200 comes to an end when the charging voltage required to maintain the maximum charging current exceeds a maximum charging voltage $V_{ch}$. $V_{ch}$ is set at a level that preserves the lifetime of the second battery. Once this stage is reached, indicated at point 203 on FIG. 2a, a constant voltage phase 202 begins. During the constant voltage phase the charging voltage 210 is held at the maximum $V_{ch}$. During the constant voltage phase, the charging current drops as the difference between the charging voltage 210 and battery voltage 230 drops. The charging process is stopped when the charging current reaches a low threshold $I_{end}$. The maximum charging current and the maximum charging voltage are set by the battery manufacturer.

Figures 2B, 5A:
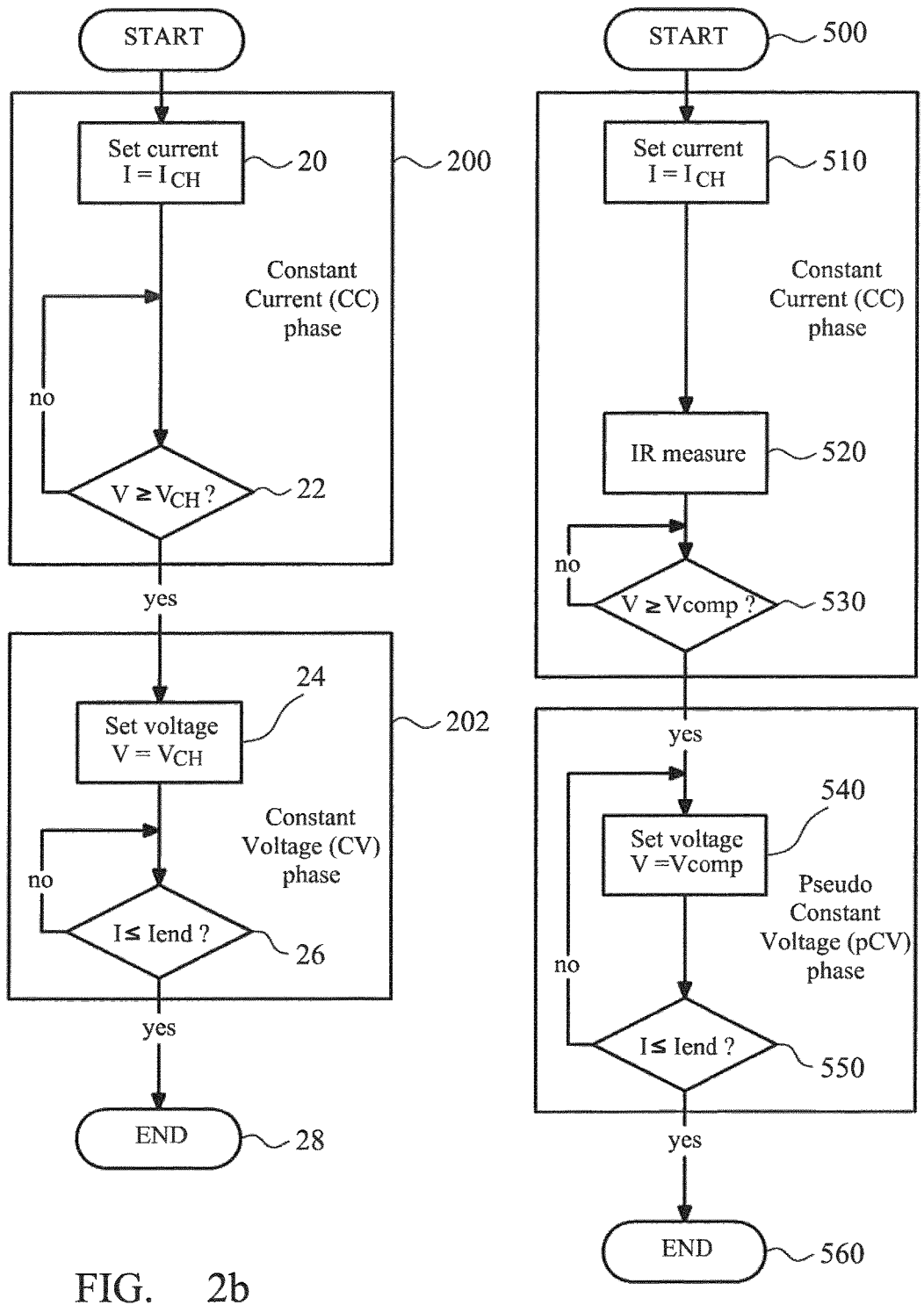

FIG. 2b illustrates the control steps in this process. In step 20 the charging current is set at $I_{ch}$, the maximum charging current. During the constant current phase, the control logic compares the charging voltage with the maximum permitted charging voltage $V_{ch}$. This is shown as step 22. If the charging voltage is below $V_{ch}$ the charging current is maintained. If the charging current is equal to or exceeds $V_{ch}$, the constant current phase is ended and the charging voltage set to $V_{ch}$. This is shown as step 24. The control logic then monitors the charging current in step 26. Once the charging current is less than $I_{end}$ the charging process is considered complete and is ended in step 28.

The charging profile illustrated in FIGS. 2a and 2b can be used in a system as described with reference to FIG. 1. However, the charge time can be made shorter by compensating for the internal resistance in the charging circuit. A shorter charge time is desirable, particularly for systems such as electronic smoking systems, in which recharge time must be only a few minutes.

Figure 3:
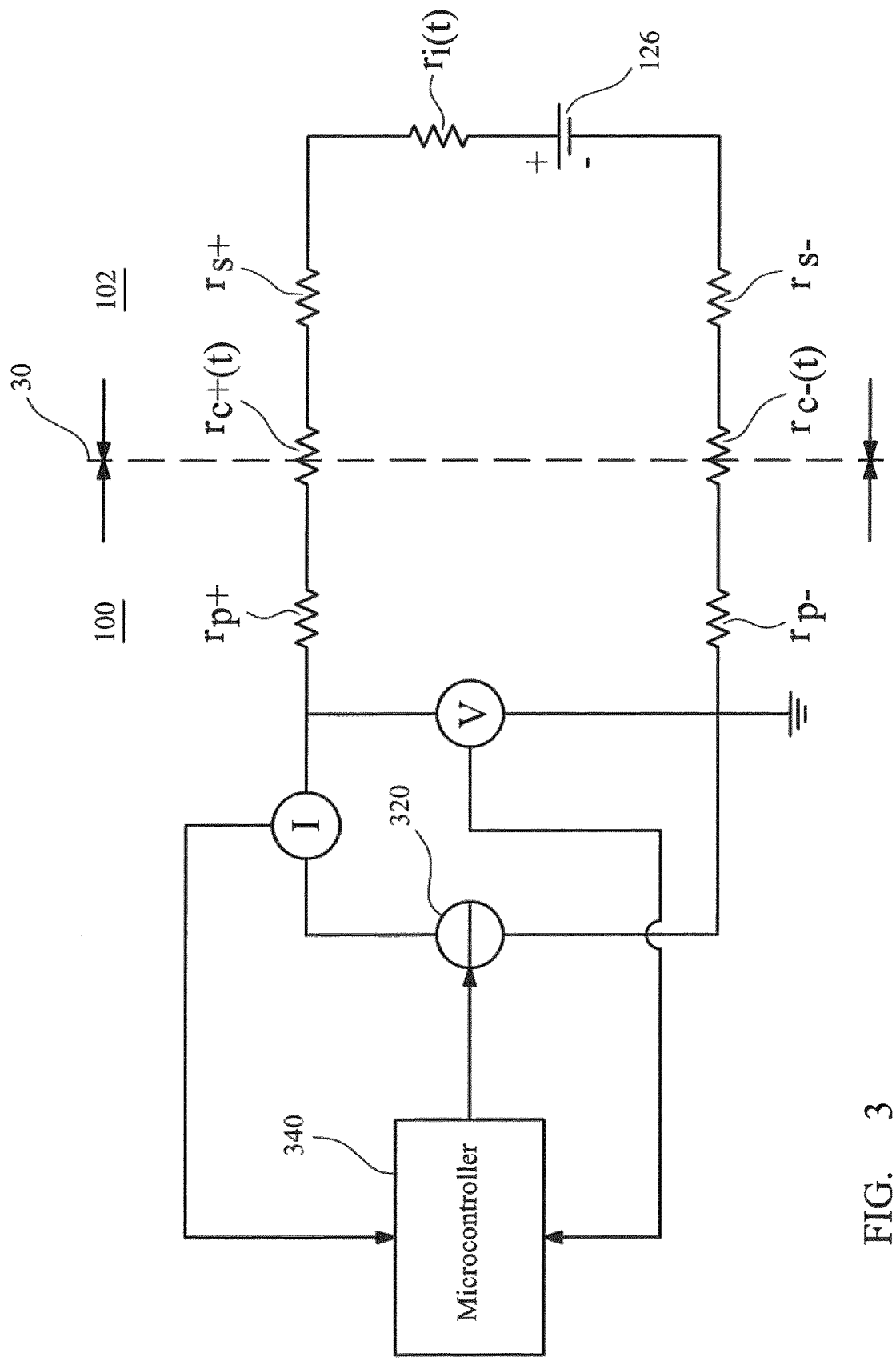
FIG. 3 is a schematic illustration of a charging circuit formed by the coupled primary and secondary devices of FIG. 1.

FIG. 3 is a circuit diagram illustrating the charging circuit formed by the coupled primary and secondary devices. The circuit is divided in a primary device side and a secondary device side. Dotted line 30 represents the boundary between the primary device 100 and the secondary device 102. The primary device side comprises a controlled voltage source 320, comprising the first battery and a voltage regulator and a microcontroller 340 configured to control the voltage source 340 based on current I and voltage V measurements.

The secondary device side comprises the second battery 126. The internal resistance of the charging circuit comprises contributions from several sources. The resistances $r_{p-}$ and $r_{p+}$ represent the electrical resistances of the electronics layout and solder tabs in the primary device. The resistances $r_{s-}$ and $r_{s+}$ represent the electrical resistances of the electronics layout and solder tabs in the primary device. The resistances $r_{c-}(t)$ and $r_{c+}(t)$ represent the electrical resistances of the contacts between the primary and secondary devices. They will vary from device to device and can vary with time from charge cycle to charge cycle. In an electrical smoking system of the type described with reference to FIG. 1, primary and secondary units may be brought in and out of contact several times a day, and each time the contact resistances may be different. The contact resistances may also increase if the contacts are not kept clean. The resistance $r_i(t)$ represents the internal resistance of the second battery, which increases over the life of the second battery.

If the parasitic resistances $r_{p-}$, $r_{p+}$, $r_{s-}$, $r_{s+}$, $r_{c-}(t)$ and $r_{c+}(t)$ are combined into a single resistance R(t), then the voltage across the second battery will be less than the charging voltage from the voltage source by $V_{drop}=I*R(t)$.

This means that the charging voltage supplied by the voltage source can be increased above the maximum $V_{ch}$ by an amount $I*R(t)$ and the voltage across the second battery will be equal to $V_{ch}$. The constant current phase of the charging profile can be extended until the point that the charging voltage reaches $V_{ch}+I*R(t)$. The charging voltage supplied thereafter can also be controlled to be more then $V_{ch}$ but no more than $V_{ch}+I*R(t)$.

Figure 4:
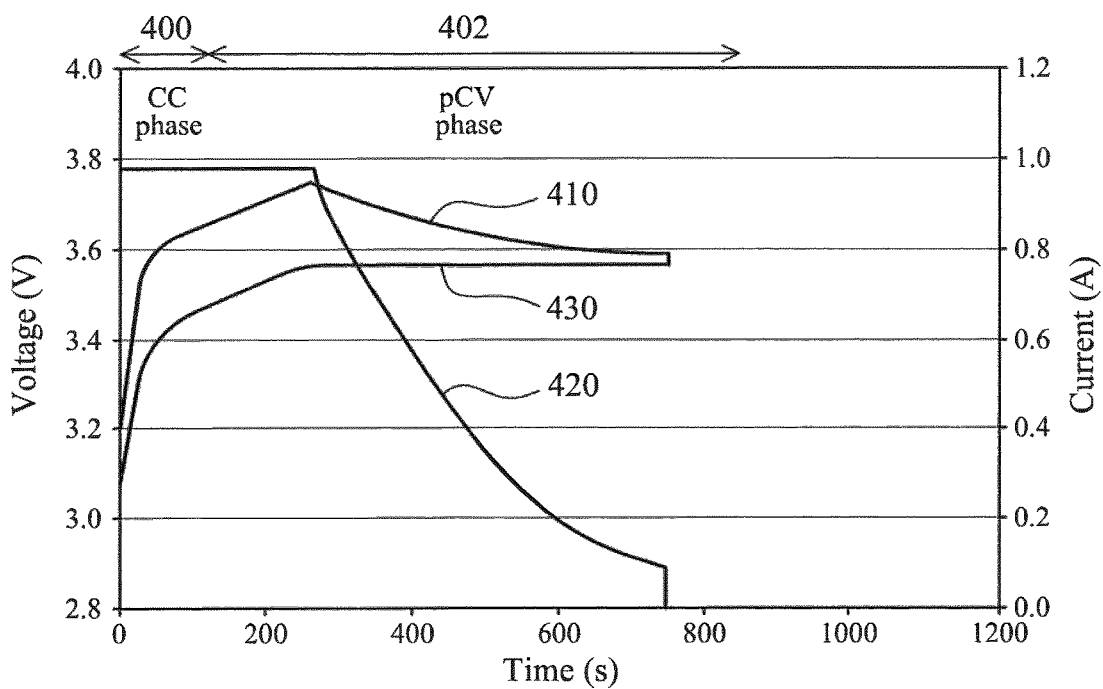
FIG. 4 shows a charging profile in accordance with an embodiment of the invention.

FIG. 4 illustrates a charging profile in accordance with an aspect of the invention, in which the supplied charging voltage exceeds $V_{ch}$. The charging profile comprises a constant current phase 400 and a pseudo-constant voltage phase 402. The charging voltage from the voltage source is shown as 410, the charging current is shown as 420 and the voltage of the second battery is shown as 430.

The constant current phase 400 extends until the charging voltage reaches a maximum of $V_{comp}=V_{ch}+I*R(t)$. In the pseudo-constant voltage phase 402, the charging voltage is controlled to equal $V_{comp}$. The charging cycle is ended when the charging current equals $1_{end}$.

Figure 5B:
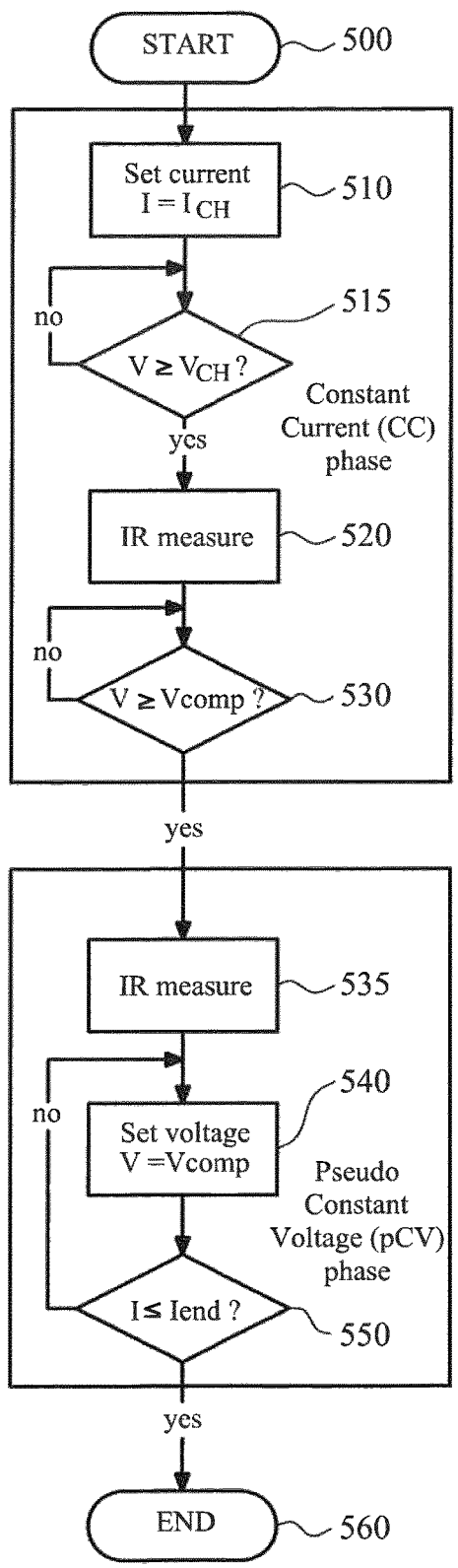
FIG. 5b is a flow diagram illustrating an alternative control process for the charging profile of FIG. 4.
Figure 5C:
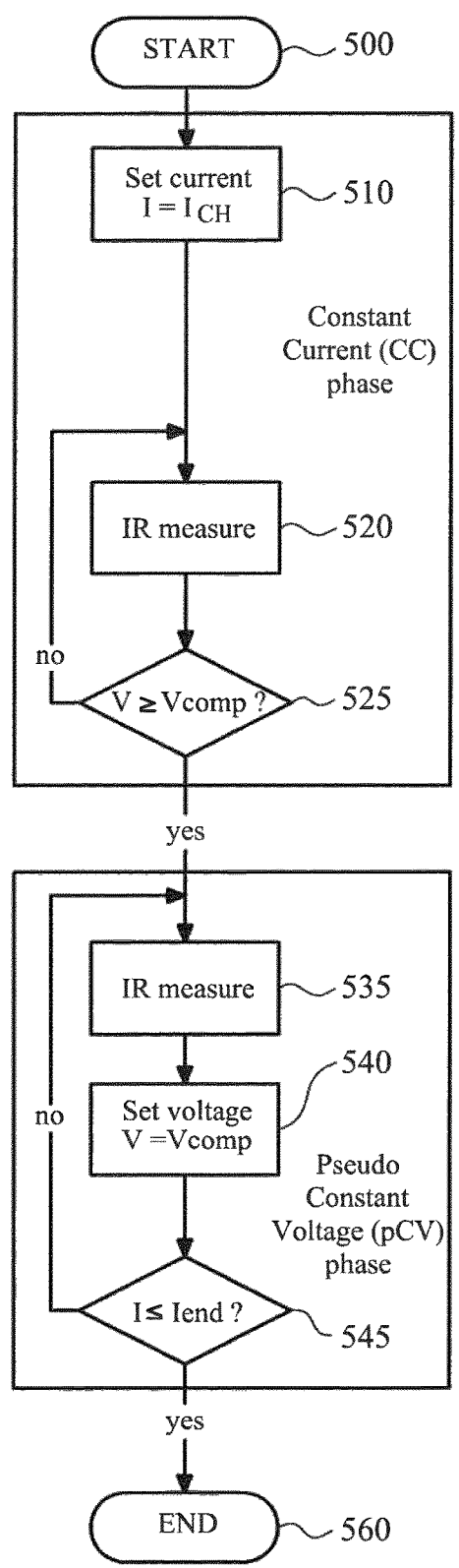
FIG. 5c is a flow diagram illustrating a further alternative control process for the charging profile of FIG. 4.

FIGS. 5a, 5b, and 5c illustrate alternative control strategies for implementing a charging profile as shown in FIG. 4. FIG. 5a shows the process starting at step 500. At step 510 the charging current is set to $I_{ch}$ the maximum charging current specified by the manufacturer. In step 520 the internal resistance of the charging circuit is measured.

Figure 6:
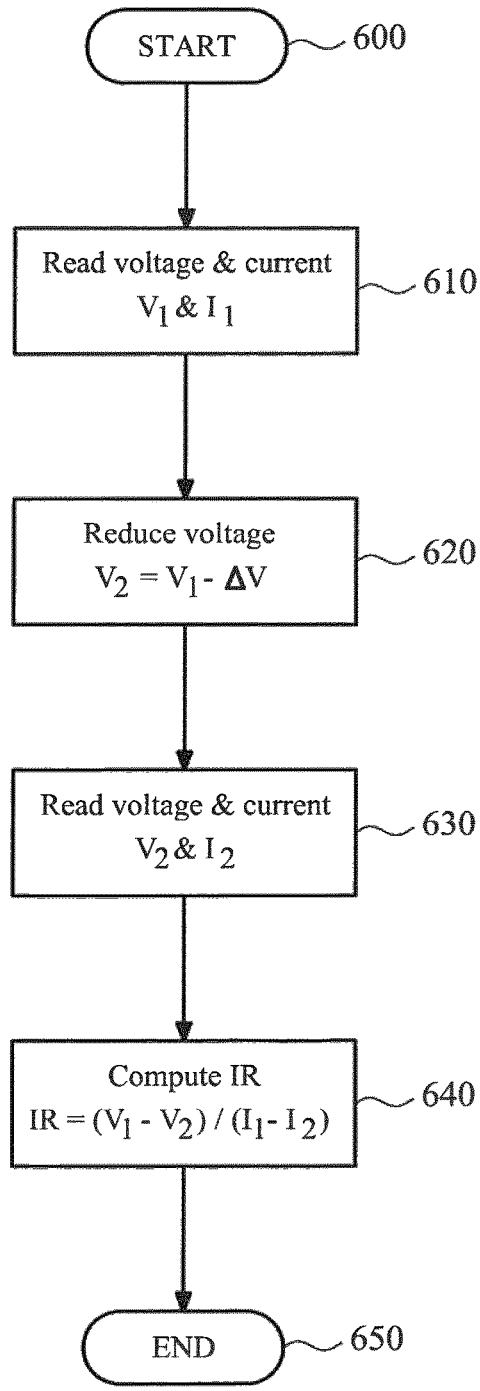
FIG. 6 is a flow diagram illustrating a process for calculating an internal resistance of the charging circuit.

The process for measuring the internal resistance of the charging circuit is shown in FIG. 6. In a first step 610 the charging current $I_1$, and charging voltage $V_1$ are measured. The charging voltage is then reduced to a lower voltage $V_2$ in step 620, where $V_2=V_1-\Delta V$. $\Delta V$ is a fixed, predetermined voltage difference of a few millivolts. The reduced voltage $V_2$ and corresponding reduced current $I_2$ are measured in step 630. The voltage is only reduced for a period of 100-400 µs, long enough for the voltage and current to be measured once (or a few times to provide an average) by the microcontroller. The internal resistance $R_i$ of the charging circuit is calculated in step 640 using the relationship $R_i=(V_1-V_2)/(I_1-I_2)$. The process ends at step 650, and may be repeated as described below.

In step 530 the charging voltage is compared with the compensated maximum charging voltage $V_{comp}$. The internal resistance $R_i$ comprises both the parasitic resistance R(t) and the internal resistance of the battery $r_i(t)$. $V_{comp}=V_{ch}+$ R(t). The maximum internal resistance of the second battery $r_{imax}$ is provided by the battery manufacturer and can be used to derive a value for R(t) from $R_i$. As an alternative, the voltage across the battery can be directly measured and passed to the microcontroller to allow the parasitic resistance to be determined. Using the value of R(t), $V_{comp}$ can be calculated.

If the charging voltage is less than $V_{comp}$ the constant current phase continues and step 530 is repeated based on the calculated value of $V_{comp}$. If the charging voltage is equal to or exceeds $V_{comp}$ then the constant current phase ends and the charging voltage is set to $V_{comp}$ in step 540. In step 550 the charging current is compared to $1_{end}$. If the charging current is greater than or equal to $1_{end}$, then the process returns to step 540. The charging voltage is reset to a new value of $V_{comp}$ based on the newly measured charging current and then the process proceeds to step 550. This control loop of step 540 and 550 can be repeated as frequently as desired. If in step 550 the charging current is less than $1_{end}$ then the charging cycle is terminated at step 560 and this is indicated to the user. The value of $1_{end}$ may be set based on the full capacity of the battery or may be based on the amount of energy required for one standard use of the secondary device, e.g. a single smoking session.

FIG. 5b illustrates an alternative charging process. In the process of FIG. 5b, steps 500 and 510 are identical to those described with reference to FIG. 5a. Step 515 is additional to the process shown in FIG. 5a. In step 515 the charging voltage is compared with $V_{ch}$, the maximum charging voltage specified by the battery manufacturer. Only if the charging voltage is equal to or exceeds $V_{ch}$ does the process proceed to step 520, determination of the internal resistance. Steps 520 and 530 are as described with reference to FIG. 5a, but in the process of FIG. 5b, the internal resistance and $V_{comp}$ are only calculated after the charging voltage reaches $V_{ch}$. In the pseudo-constant current phase of FIG. 5b, the first step is a recalculation of the internal resistance, in step 535. The internal resistance of the charging circuit may have increased during the charging process, and recalculating allows for a better calculation of $V_{comp}$ and a potentially shorter charge time. Steps 540, 550 and 560 are as described with reference to FIG. 5a.

FIG. 5c illustrates a further alternative charging process. In the process of FIG. 5c steps 500, 510 and 520 are as described with reference to FIG. 5a. In step 525 the charging voltage is compared with the compensated maximum charging voltage $V_{comp}$, in the same manner as in step 530 in FIGS. 5a and 5b. However, in step 525, if the charging voltage is greater than or equal to $V_{comp}$ the process returns to step 520.

Steps 535 and 540 of FIG. 5c are identical to steps 535 and 540 of FIG. 5b. In step 545 the charging current is compared to $1_{end}$. If the charging current is greater than or equal to $1_{end}$ then the process return to step 535, and the internal resistance is recalculated and $V_{comp}$ updated prior to step 540. If in step 550 the charging current is less than $1_{end}$ then the charging cycle is terminated at step 560 and this is indicated to the user. As explained above, the value of $1_{end}$ may be based on the full capacity of the battery so that the battery is charged to a certain proportion of full charge, say 90% of full charge. Alternatively $1_{end}$ may be set based on the amount of stored energy required for a single use of the secondary device.

FIGS. 5a, 5b and 5c are example control processes and it should be clear that other processes are possible in accordance with the same general principle. For example any of the constant current phases of FIGS. 5a, 5b and 5c, can be used with any of the pseudo-constant voltage phases of FIGS. 5a, 5b and 5c, providing nine different possible control processes.

In systems such as an electrical smoking system, any decrease in the time taken to recharge the secondary device may significantly increase user adoption. A key requirement is ease and convenience of use, and in a recharge cycle lasting just a few minutes every second is noticeable. The recharging processes described with reference to FIG. 4 and FIGS. 5a, 5b and 5c provide for rapid recharging within the limits of operation specified by the battery manufacturer.

Figure 7:
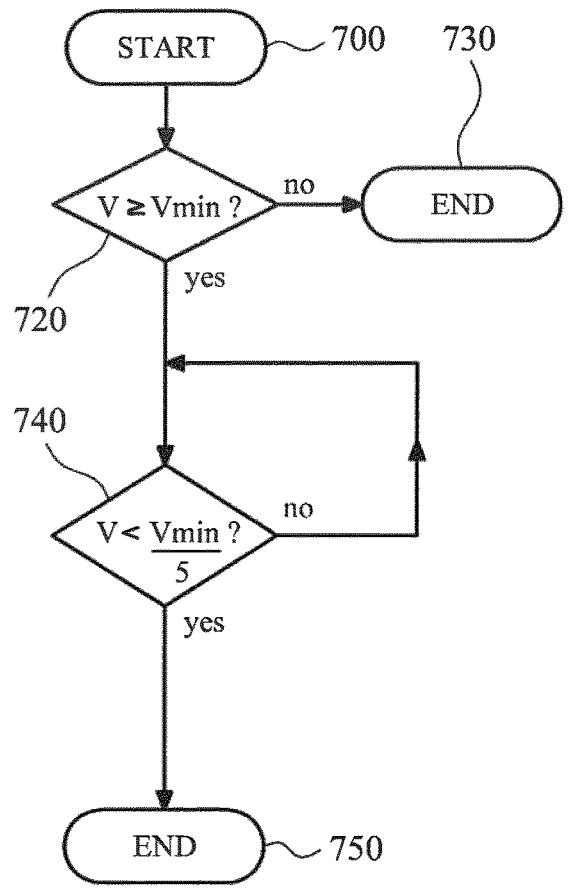
FIG. 7 is flow diagram illustrating a control process for preventing excessive discharge of the secondary battery in a system of the type shown in FIG. 1.

A further aspect of this disclosure is illustrated in FIG. 7. With reference to the secondary device shown in FIG. 1, the secondary device 102 may be configured to prevent operation if the second battery drops below 20% of its fully charged level. This protects the life of the second battery. The control electronics 128 are configured to monitor the battery voltage of the second battery in use. When the battery voltage drops to 20% of the fully charged voltage, the device is disabled until the second battery has been recharged to a threshold charge level. The threshold charge level may be chosen to be less that maximum battery capacity, say 90% of full capacity, again to protect the life of the battery. The 20% level has been found to be a good threshold level for lithium iron phosphate batteries, but any level between 15% and 25% may be used and other levels may be chosen to suit different battery chemistries.

FIG. 7 illustrates the control process that the control electronics 128 is configured to execute. The process starts in step 700. In step 720 the battery voltage of the secondary battery is compared with a minimum starting voltage $V_{min}$, for allowing operation of the device. If the battery voltage is less than $V_{min}$ then the secondary device will not allow further operation of the heater and will enter a low power mode to conserve battery capacity until the next recharge cycle. The process then ends in step 730. In the case of a smoking device this prevents the heating operation of the device if there is insufficient charge in the second battery to complete a single smoking experience (corresponding to the experience of smoking a conventional cigarette say). Once the second battery has been recharged the process can restart at step 700.

If the battery voltage is greater than or equal to $V_{min}$ then the device is allowed to fully operate. During operation, the battery voltage of the second battery is repeatedly compared to a second threshold, in this case $V_{min}/5$, i.e. 20% of the minimum starting battery voltage. This is shown as step 740. If the battery voltage is greater than $V_{min}/5$ then the device continues to be operable and step 740 is repeated. If the battery voltage is less than or equal to $V_{min}/5$ then the device enters the low power mode in which the heater is disabled in step 750. Once the heater is disabled, the control process must start again at step 700 so the heater cannot operate until the second battery is recharged to a level at which that the battery voltage is greater than or equal to $V_{min}$.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. A portable electronic smoking system, comprising: rechargeable primary and secondary devices,
    the primary device comprising a housing and having a first battery, and
    the secondary device being an electrically heated tobacco device and comprising a second battery and a heater configured to heat an aerosol-forming substrate, said secondary device being configured to be received within the housing of the primary device during a recharging cycle,
    wherein the primary device and secondary device are configured to be coupled together and to form a charging circuit,
    wherein a capacity of the first battery is between five times and forty times a capacity of the second battery,
    wherein the primary and secondary devices are configured to recharge the second battery from the first battery, and
    wherein the primary device further comprises:
        a pair of output terminals configured to connect to the second battery;
        a DC power source;
        a voltage regulator connected between the DC power source and to the output terminals and being configured to control a charging voltage; and
        a microprocessor coupled to the voltage regulator and to the output terminals, and being configured to: control the voltage regulator to supply a first charging voltage and, after the first charging voltage has reached a predetermined voltage level, determine an internal resistance of the charging circuit by measuring a current in the charging circuit at the first charging voltage and at a second charging voltage, wherein the second charging voltage is lower than the first charging voltage, and limit the first charging voltage supplied by the voltage regulator to a maximum charging voltage based on the determined internal resistance and on a predetermined maximum voltage of the second battery.

2. The portable electronic smoking system according to claim 1, wherein the microprocessor is further configured to:
    calculate the maximum charging voltage based on the determined internal resistance and the predetermined maximum voltage of the second battery; and
    adjust the first charging voltage to maintain a predetermined charging current until the first charging voltage reaches the calculated maximum charging voltage, thereafter adjust the first charging voltage to a level at or below the calculated maximum charging voltage, and thereafter periodically or continuously recalculate the calculated maximum charging voltage and adjust the first charging voltage to maintain the first charging voltage at a level at or below the recalculated maximum charging voltage.

3. The portable electronic smoking system according to claim 1, wherein the microprocessor is further configured to determine the second charging voltage by reducing a voltage from the first charging voltage by a predetermined voltage difference.

4. The portable electronic smoking system according to claim 1, wherein the microprocessor is further configured to recalculate the internal resistance periodically.

5. The portable electronic smoking system according to claim 1, wherein the second battery has a diameter of 10 mm and a length of 37 mm.

6. A method of charging a second battery in a secondary electrically heated tobacco device from a first battery in a primary device comprising a housing, said secondary device comprising a heater configured to heat an aerosol-forming substrate, the primary and secondary devices forming a portable electronic smoking system, wherein a capacity of the first battery is between five times and forty times a capacity of the second battery, the method comprising:

connecting the secondary device to the primary device having an adjustable voltage source, to form a charging circuit;

controlling a first charging voltage supplied by the voltage source to provide a predetermined charging current to the second battery;

determining an internal resistance of the charging circuit by measuring a current in the charging circuit at the first charging voltage and at a second charging voltage, wherein the second charging voltage is lower than the first charging voltage;

calculating a maximum charging voltage based on the determined internal resistance and on a predetermined maximum voltage of the second battery; and adjusting the first charging voltage to maintain the predetermined charging current until the first charging voltage reaches the maximum charging voltage, and thereafter adjusting the first charging voltage to maintain the first charging voltage at a level at or below the maximum charging voltage, wherein the steps of determining the internal resistance and calculating the maximum charging voltage are carried out only after the first charging voltage has reached a predetermined voltage level.

7. The method according to claim 6, wherein the second charging voltage has a predetermined voltage difference from the first charging voltage.

8. The method according to claim 6, wherein the steps of calculating the maximum charging voltage and adjusting the first charging voltage are carried out a plurality of times during a single charging cycle.

9. The method according to claim 6, wherein the steps of calculating the maximum charging voltage and adjusting the first charging voltage are carried out continuously after the first charging voltage first reaches the maximum charging voltage during a single charging cycle.

10. The method according to claim 6, wherein the step of determining the internal resistance is carried out periodically.

11. The method according to claim 6, further comprising the step of returning the secondary device to the primary device for recharging the second battery after a single smoking session.

12. The method according to claim 11, wherein the single smoking session lasts 7 minutes.

13. The method according to claim 11, further comprising the step of recharging the second battery for less than 6 minutes.

\* \* \* \* \*